US007962376B2

(12) United States Patent
Smith et al.

(10) Patent No.: US 7,962,376 B2
(45) Date of Patent: Jun. 14, 2011

(54) SYSTEM, METHOD, AND COMPUTER READABLE STORAGE MEDIUM FOR INFORMING A USER ABOUT AN ITEM THAT IS AVAILABLE VIA AN E-COMMERCE WEBSITE

(75) Inventors: Charles Eric Smith, Austin, TX (US); Chris Tooley, Blanco, TX (US); Lanny Wayne Walker, Austin, TX (US); James Edward Butcher, Round Rock, TX (US); Roy Stacey Zuniga, Austin, TX (US)

(73) Assignee: Unwired Nation, Austin, TX (US)

( * ) Notice: Subject to any disclaimer, the term of this patent is extended or adjusted under 35 U.S.C. 154(b) by 1221 days.

(21) Appl. No.: 11/228,841

(22) Filed: Sep. 16, 2005

(65) Prior Publication Data

US 2007/0067224 A1 Mar. 22, 2007

(51) Int. Cl.
*G06Q 30/00* (2006.01)
(52) U.S. Cl. .............. 705/26.3; 705/26.1; 705/27.1; 705/1; 705/37
(58) Field of Classification Search ............. 705/26, 705/27, 37, 1
See application file for complete search history.

(56) References Cited

U.S. PATENT DOCUMENTS

| 6,507,818 | B1 * | 1/2003 | Fishman et al. ............. 704/270 |
| 6,510,417 | B1 | 1/2003 | Woods et al. |
| 6,658,093 | B1 | 12/2003 | Langseth et al. |
| 6,768,788 | B1 | 7/2004 | Langseth et al. |
| 6,901,430 | B1 | 5/2005 | Smith |
| 6,934,684 | B2 | 8/2005 | Alpdemir et al. |
| 2002/0023038 | A1 | 2/2002 | Fritsch et al. |
| 2002/0062276 | A1 * | 5/2002 | Krueger et al. ............... 705/37 |
| 2004/0006478 | A1 | 1/2004 | Alpdemir et al. |
| 2005/0080712 | A1 | 4/2005 | Bauer et al. |
| 2005/0228735 | A1 * | 10/2005 | Duquette ....................... 705/37 |
| 2005/0234812 | A1 * | 10/2005 | Dorr ............................ 705/37 |
| 2005/0246235 | A1 * | 11/2005 | Wilczynski et al. .......... 705/26 |
| 2007/0210155 | A1 * | 9/2007 | Swartz et al. ................ 235/383 |

OTHER PUBLICATIONS

"No Call Waiting For Your Online Shopping", Leslie Walker. The Washington Post. Washington, D.C.: Jun. 9, 2002. p. H.07. Retrieved via Proquest on Dec. 19, 2010.*
International Search Report and Written Opinion of the International Searching Authority, for Application No. PCT/US06/34723, mailed Aug. 28, 2007.

* cited by examiner

*Primary Examiner* — Michael A. Misiaszek
(74) *Attorney, Agent, or Firm* — Toler Law Group, IP

(57) ABSTRACT

A user interface for communicating over a voice channel regarding an item that is available at an e-commerce website is disclosed and includes a speaker to communicate at least one audible voice message and at least one audible non-voice message. The audible voice message can indicate the status of an item and/or the status of an offer to purchase the item. Further, the at least one audible non-voice message can indicate a time period in which user input can be received. Moreover, the at least one audible non-voice message is transmitted concurrently with the at least one audible voice message.

28 Claims, 10 Drawing Sheets

SYSTEM, METHOD, AND COMPUTER READABLE STORAGE MEDIUM FOR INFORMING A USER ABOUT AN ITEM THAT IS AVAILABLE VIA AN E-COMMERCE WEBSITE

FIELD OF THE DISCLOSURE

The present disclosure relates to user interfaces for communicating with e-commerce websites.

BACKGROUND

As of May 2005, the Cellular Telecommunications Industry Association (CTIA) estimates that there are 182 million wireless subscribers in the United States. Further, the CTIA estimates that over 2.5 billion text messages are sent every month. Text messages, sent via short messaging service (SMS), are currently used by Internet companies to deliver notifications to mobile telephones. Unfortunately, text messaging is not secure, does not provide guaranteed delivery, is not free, and is not sent in real-time.

Regarding security issues, programs have been provided that can enable someone to spoof a sender's SMS address. Further, since SMS messages are sent using "store and forward" based systems, there is no guarantee that sent SMS messages are received within any particular timeframe. As such, some SMS providers present a disclaimer to their users that the provider is not responsible for messages that are lost or significantly delayed due to transmission via the Internet. Also, unlike voice calling plans, there currently are no "nights and weekends free" service plans for SMS messaging.

For certain e-commerce websites, e.g., on-line auction sites, text messaging is not a very efficient way to interact with the website because the auctions are typically fast paced and require confirmed delivery of bids. Further, the auction sites may utilize instant feedback for usability and understanding of the system. Moreover, a text messaging interface can be difficult to use with a mobile device due to the size of the text on a small display screen and the requirement to read the text. These problems become more evident while trying to send and receive text messages while driving.

Accordingly, there is a need for an improved system and method of communicating with e-commerce websites, e.g., auction websites.

DETAILED DESCRIPTION OF THE DRAWINGS

A method of contacting a user about an item that is available via an e-commerce website is disclosed and includes authenticating a user and transmitting at least one voice message to the user. The voice message indicates the status of an item and/or the status of an offer to purchase the item, e.g., a bid submitted at an online auction site. Additionally, the method includes transmitting at least one audible non-voice message to the user. The at least one audible non-voice message indicates a time period in which user input can be received.

In another embodiment, a user interface for communicating over a voice channel regarding an item that is available at an e-commerce website is disclosed and includes a speaker to communicate at least one audible voice message and at least one audible non-voice message. The audible voice message can indicate the status of an item and/or the status of an offer to purchase the item. Further, the at least one audible non-voice message can indicate a time period in which user input can be received. Moreover, the at least one audible non-voice message is transmitted concurrently with the at least one audible voice message.

In still another embodiment, a method is disclosed and includes presenting a list of items for sale and receiving a user selection of an item from the list of items for sale. Further, the method includes placing the selected item on an action list in response to the user selection and placing a call to the user over a voice channel before an end of an offer for sale of the selected item. The method also includes authenticating the user and transmitting a plurality of voice messages over the voice channel after the user is authenticated. Additionally, the method includes transmitting an audible non-voice message while transmitting at least one of the plurality of voice messages.

In yet still another embodiment, a method is provided and includes receiving a request to contact a user from a vendor website server regarding an item offered for sale at the vendor website server and retrieving contact information for the user. Additionally, the method includes initiating a call to the user over a voice channel. The method also includes transmitting at least one voice message to the user and transmitting at least one audible non-voice message to the user.

In still yet another embodiment, a system for notifying a user about an item at an auction website over a voice channel is provided and includes a voice generation module that is embedded within a memory. The voice generation module includes a first voice message. Further, the first voice message includes a greeting, a reason for the call, and a prompt for a personal identification number. The reason for the call is related to an event associated with the auction website.

Figure 1:
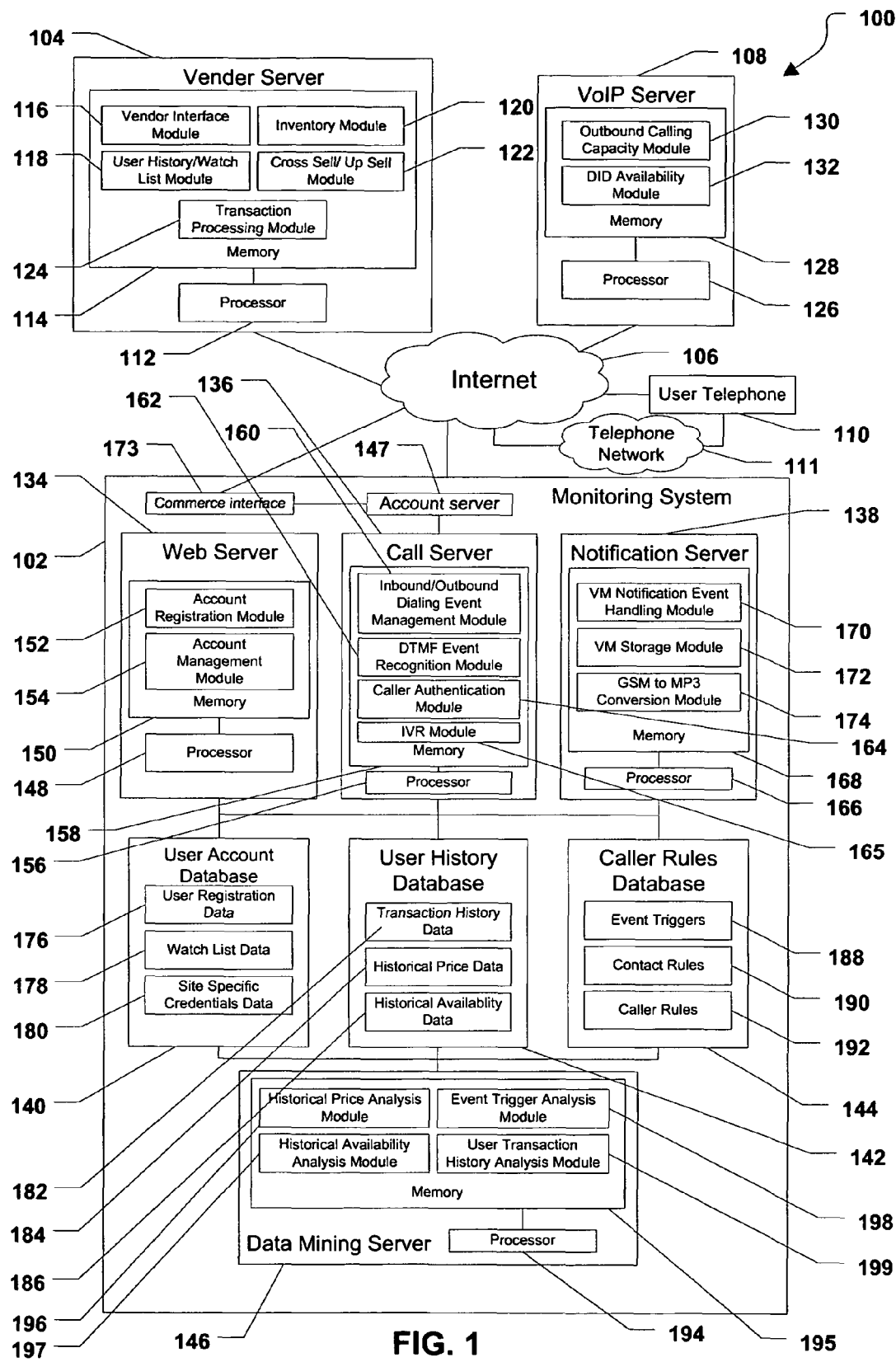
FIG. 1 is a block diagram representing a system of facilitating e-commerce.

Referring to FIG. 1, a system of facilitating e-commerce is shown and is designated 100. As shown, the system 100 includes a monitoring system 102 that communicates with a vender server 104 via the Internet 106. Further, the monitoring system 102 communicates with a voice over Internet protocol (VoIP) server 108 via the network 106. In a particular embodiment, a user telephone 110 is coupled to the monitoring system 102 via the Internet 106. Further, the user telephone 110 can be coupled to the Internet 106 via a telephone network 111, e.g., a public switched telephone network (PSTN) or a wireless telephone network, such as global system for mobile communication (GSM) network.

In a particular embodiment, the vender server 104 can be an e-commerce server that offers goods for sale with fixed pricing or escalating pricing based on an auction format. As shown, the vender server 104 can include a processor 112 and a memory 114 coupled to the processor 112. In a particular embodiment, one or more software applications or modules may be embedded within the memory 114 of the vender server 104. For example, the vender server 104 can include a vender interface module 116 embedded within the memory 114. The vender interface module 116 can provide connectivity with the vender server 104, e.g., via the Internet 106. In an illustrative embodiment, the vender server 104 also includes a user history/watch list module 118 than can be used to track the shopping or bidding history of one or more users and items that one or more user are seeking to purchase.

As shown in FIG. 1, the vender server 104 can further include an inventory module 120 that can be used to track the inventory provided for sale via the vender server 104. Further, the vender server 104 can include a cross sell/up sell module 122 that can be used to increase the sales provided by the vender server 104. For example, when a user purchases a particular item, the cross sell/up sell module 122 can recognize related items that may be useful to the user and offer those related items to the user for sale in conjunction with a purchased item. FIG. 1 also shows that the vender server 104 can include a transaction processing module 124 for processing transactions with the vender server 104.

As depicted in FIG. 1, the VoIP server 108 can include a processor 126 and a memory 128 that is accessible to the processor 126. In a particular embodiment, one or more software applications or modules may be embedded within the memory 128 of the VoIP server 108. For example, as shown, an outbound calling capacity module 130 can be embedded within the memory. In a particular embodiment, the outbound calling capacity module 130 can determine the number of outbound calls that the VoIP server 108 is capable of establishing at any given time. FIG. 1 also indicates that the VoIP server 108 can include a direct inward dialing (DID) availability module 132 that is embedded within the memory 128 of the VoIP server 108. In an illustrative embodiment, the DID availability module 132 can determine whether direct inward dialing is available for a particular user and if so, a DID service can be use to identify a called party, e.g., by using DTMF or other signaling means, before connecting a call to a called party.

FIG. 1 illustrates that the monitoring system 102 includes a web server 134, a call server 136, and a voice mail notification server 138. Additionally, the monitoring system 102 includes a user account database 140, a user history database 142, and a caller rules database 144. Each of the databases 140, 142, 144 can be coupled to one or more of the servers 134, 136, 138 within the monitoring system 102. FIG. 1 also indicates that the monitoring system 102 can includes a data mining server 146 that can be coupled to the databases 140, 142, 144. Additionally, an account server 147 can be coupled to the call server 136.

In a non-limiting, exemplary embodiment, the web server 134 includes a processor 148 and a computer readable medium, e.g., a memory 150, that is accessible to the processor 148. In a particular embodiment, one or more software applications or modules may be embedded within the memory 150 of the web server 134. For example, an account registration module 152 and an account management module 154 can be embedded within the memory 150 of the web server 134. In a particular embodiment, the modules 152, 154 can be used to allow one or more users to establish user accounts with the monitoring system 102. Further, the modules 152, 154 can be used to allow users to configure multiple user accounts on a per-vender basis and configure one or more notification events, or trigger events, on a per-vender basis.

Additionally, in a particular embodiment, the modules 152, 154 can be used to allow one or more users to update contact information, or notification information, previously input to the monitoring system. The contact information can include alternate numbers at which a user can be reached, e.g., a home telephone number, a work telephone number, and a mobile telephone number. Also, in a particular embodiment, the modules 152, 154 can allow users to configure call security settings for the user accounts, e.g., the modules 152, 154 can allow each user to establish a personal identification number (PIN) with the system and each user can be prompted to input a PIN when contacted by the monitoring system 102.

As illustrated in FIG. 1, the call server 136 within the monitoring system 102 can include a processor 156 and a computer readable medium, e.g., a memory 158, that is accessible to the processor 156. In a particular embodiment, one or more software applications or modules may be embedded within the memory 158 of the call server 136. For example, an inbound/outbound dialing event management module 160 may be embedded within the memory 158. Also, a DTMF event recognition module 162 may be embedded within the memory 158. Further, a caller authentication module 164 may be embedded within the memory 158. FIG. 1 also shows that an interactive voice response (IVR) module 165 can be embedded within the memory 158. 20. In an alternative embodiment, the caller authentication module may be part of a third party identification verification system.

In a particular embodiment, the inbound/outbound dialing event management module 160 within the call server 136 can operate in order to establish calls to users when notification events are detected. Further, the DTMF event recognition module 162 can be used to handle DTMF recognition of input received from a user device, e.g., a telephone with touch-tone capabilities. Moreover, the caller authentication module 164 can interact with other components within the monitoring system, e.g., the user account database 140, in order to provide security validation such as telephone number verification or PIN verification. Additionally, the modules 160, 162, 164 within the call server 136 can operate with other components within the monitoring system 102 in order to handle one or more user sessions at the vender websites.

As depicted in FIG. 1, the voice mail notification server 138 can include a processor 166 and a computer readable medium, e.g., a memory 168, that is accessible to the processor 166. In a particular embodiment, one or more software applications or modules may be embedded within the memory 168 of the voice mail notification server 138. For example, a voice mail notification event handling module 170 can be embedded within the memory 168. Moreover, a voice mail storage module 172 can be embedded within the memory 168. A GSM to MPEG layer-3 (MP3) conversion module 174 can also be embedded within the memory 168.

In a particular embodiment, the voice mail notification event handling module 170 handles the distribution of non-live audio notifications, e.g., to voice mail systems. Further, the GSM to MP3 conversion module 174 can be used to convert GSM audio files to MP3 audio files. Additionally, the voice mail storage module 172 can be used to store various audio notifications that can be broadcast to users that are registered with the monitoring system 102.

In an exemplary, non-limiting embodiment, the account server 147 interacts with the call server 136 and a commerce interface 173. In a particular embodiment, the account server 147 can act as a "virtual user" for the vender websites when a registered user has been authenticated by the call server 136. Further, the account server 147 receives DTMF inputs, e.g., from a user via the call server 136, and translates the DTMF inputs to outbound Web events on a per vendor basis. For example, a user may press a "1" at a keypad of the user telephone and the account server can translate that response to an instruction to an auction website to increase a bid by one increment. Additionally, the account server 147 receives inputs from the vender websites and translates the inputs into audible phone events. Also, the account server 147 can translate the inputs into audible menus that can be broadcast to a registered user.

The commerce interface 173 may be implemented as an application programming interface (API) that can interact with the account server 147 and the vender interface module 116 at the vender server 104 in order to receive data representative of purchasing events and bidding events.

As illustrated in FIG. 1, the user account database 140 can include user registration data 176, watch list data 178, and site specific credentials 180. Also, as shown in FIG. 1, the user history database 142 can include transaction history data 182, historical price data 184, and historical availability data 186. The caller rules database 144 can include one or more event triggers 188, i.e., notification events. For example, the notification events can include the offer for sale of a particular item at a particular vendor website at a target price or the imminent end of an auction for a sought after item that a user has placed a bid.

In a particular embodiment, the caller rules database 144 can also include one or more contact rules 190 and one or more caller rules 192. The contact rules 190 can indicate the manner in which a registered user is to be contacted and a user defined order of calling a plurality of different contact numbers for the user. Further, the caller rules 192 can include user defined rules that will always control the action of the monitoring system when acting as a "virtual user." For example, when a particular item is offered for sale, the user can specify for the monitoring system to automatically purchase the item at the asking price. Thereafter, the monitoring system can contact the user to indicate that the item has been purchased. In an alternative embodiment, the data provided by the databases 140, 142, 144 can be stored in a single database that is accessible to one or more of the other components within the monitoring system 102.

Each of the servers described above is a processing element that can be a server, as described, or a process. Further, any number or combination of the modules described above can be stored and executed within a single processing element or multiple processing elements in communication with each other.

Figure 2:
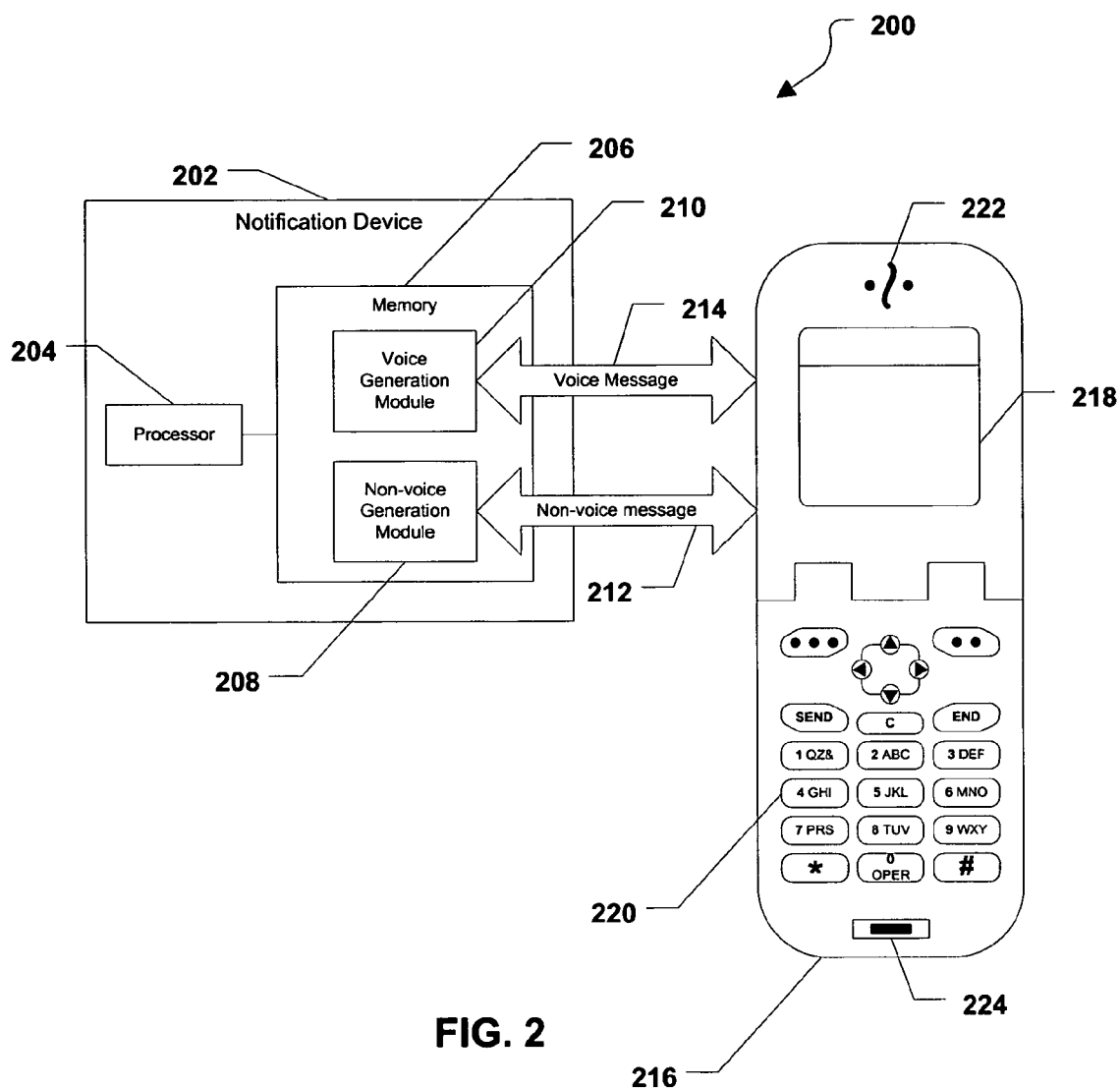
FIG. 2 is a block diagram representing a system of contacting a user over a voice channel about an item available for sale at a vendor website.

FIG. 2 illustrates a system, designated 200, of contacting a user over a voice channel about an item available for sale at a vendor website. As shown, the system 200 includes a notification device 202 that includes a processor 204 and a memory 206 that is accessible to the processor 204. Further, a non-voice generation module 208 and a voice generation module 210 are embedded within the memory 206.

In a particular embodiment, the notification device 202 transmits a non-voice message 212 and a voice message 214 to a communication device 216, e.g., a wireless telephone. Additionally, in a particular embodiment, the non-voice generation module 208 generates the non-voice message 212 that is transmitted to the communication device 216. Also, in a particular embodiment, the voice generation module 210 generates the voice message 214 that is transmitted to the communication device 216. In a particular embodiment, the voice generation module 210 can generate and transmit a first voice message, a second voice message, a third voice message, etc. Table 1 includes a plurality of exemplary voice messages that may be transmitted to the communication device 216 by the voice generation module 210. As shown, the messages are numbered, but the messages are not necessarily played in the order shown.

TABLE 1

Exemplary Voice messages.

| Message | Description |
|---|---|
| This is <service provider> calling about your <auction provider> auction status. Please enter your four digit PIN number now. | Played when user first contacted by service provider. |
| Your PIN number is incorrect. Please try again or press star and your PIN number will be mailed to your email address. | Played when an incorrect PIN is received. |
| Your PIN did not match. Please try again. | Played when an erroneous or non-matching PIN is received. |
| You can now bid on auction number <auction number> in the sub-category <sub-category name> of category <category name>. | Played when a correct PIN is received. |
| The current high bid is <current bid>. | Played after auction announcement and whenever an item price changes. |
| You are currently the high bidder. | Played when user is high bidder. |
| You are currently not the high bidder. | Played when user is not the high bidder. |
| To place a bid using <service provider>, press star. | Played when user is not the high bidder. |
| The current price is <current price>. | Played after auction announcement and whenever an item price changes. |
| There is <time remaining> left in the auction. | Played periodically when audio, e.g., when audio is idle. |
| To enter a minimum bid of <minimum bid> press # now. | Played when user is not the high bidder. |
| To enter a maximum bid, enter the amount in dollars and cents, and then press #. | Played when user is high bidder or when user is not the high bidder. |
| Your bid is less than the current minimum bid. | Played when a user's bid is less than the current high bid. |
| You have entered a bid of <bid amount>. To confirm your bid, press 1. To enter a different bid amount, press 2. To cancel this bid press star. | Played when a user's bid is higher than the current high bid. |
| Congratulations! Your bid placed through <service name> was successful. | Played when the bid is accepted by the auction provider and the bid is the highest bid. |
| We're sorry. The price has changed. | Played when the bid is not accepted. |
| Your bid was placed successfully, but you have been outbid. | Played when the auction provider accepts the bid, but the bid is not the highest bid. |
| To hear your current max bid, press 2. To get the current price for this auction, press 3. To hear the time left in this auction, press 4. To get the category for this auction, press 5. To hear these options again, press 9. | Played at the user's request, after the initial bid information, and when the system is idle for a predetermined time period. |
| You have pressed an invalid key. | Played when an invalid |

TABLE 1-continued

Exemplary Voice messages.

| Message | Description |
|---|---|
|  | entry is received from the user. |
| We're sorry. This auction has ended early. Please check <auction provider> for more details. | Played if the auction ends early, e.g., auction cancelled or item bought using a "buy it now" option. |
| Your current max bid is <current max bid>. | Played at the user's request. |
| You have cancelled your bid. | Played after the user presses *. |
| We're sorry. We are unable to communicate with <auction provider>. | Played after a failed bid attempt, a failed sign in, a failed offer, or a failed confirm. |
| Please try again. | Played after a failed bid attempt, a failed sign in, a failed offer, or a failed confirm. |
| We're sorry. Your PIN is correct, but the <auction provider> username and password associated with your account must be updated, please log into your account at <service provider> to update your information. Thank you. | Played after a failed sign in. |
| We're sorry. This auction ended before your bid was submitted. Thank you for using <service provider>. You have not yet bid on this item. | Played when a bid is confirmed, but the auction has ended. Played when a user requests a bid status, but the user has not bid in the item. |
| Placing bid. Please hold while we attempt to place your bid with <auction provider>. | Played when a bid is confirmed by the service provider. |
| The auction has ended. | Played when an auction ends. |
| You have won the auction. Please check your email for information from <auction provider> on completing this transaction. | Played when a user wins an auction. |
| You did not win this auction. Better luck next time. | Played when the user does not win an auction. |
| Please note: You can skip ahead if you know your selection. Audio prompts can be interrupted at any time. | Played when the system is idle. |
| Updating auction status. Please hold while we verify the close of this auction with <auction provider>. | Played while verifying that an auction has ended. |

As depicted in FIG. 2, the communication device 216 includes a display 218, a keypad 220, a speaker 222, and a microphone 224. In a particular embodiment, the communication device 216 can receive the non-voice message 212 and the voice message 214 from the notification device 202 and broadcast, or communicate, the non-voice message 212 and the voice message 214 to a user via the speaker 222. The non-voice message 212 can be broadcast in the background of the voice message 214. For example, the non-voice message 212 can be a low pulsing tone that slowly increases in frequency, volume, and/or pitch while the voice message 214 is broadcast to the user. In a particular embodiment, the pulsing of the non-voice message 212 indicates a countdown of time, e.g., the time remaining to purchase an item via an auction website.

A user can respond to the voice message 214 by speaking a command into the microphone 224 or by toggling a button on the keypad 220 that corresponds to a menu option presented by the voice message 214. Accordingly, the notification device 202 can communicate the status of an item that is available at a vendor website to a user via the communication device 216. Further, a user can take action with respect to the item by inputting a command via the keypad 220 or the keypad 224.

In a particular embodiment, the system 200 can also provide the user with a tutorial in order to teach the user how to interact with the system 200 during an auction for an item. The tutorial can simulate an auction and allow a user to bid on an imaginary item. Table 2 includes a plurality of voice messages that can be transmitted to a user during the tutorial.

TABLE 2

Exemplary Tutorial Voice Messages.

Tutorial Message

This is <service provider> calling with an interactive tutorial for your new auction service. Please enter your four digit PIN now to continue.
If you have previously used this tutorial, press the * key during the tutorial to skip straight to the interactive bidding simulation. Otherwise, please listen carefully for instructions on getting the most out of <service provider>.
After each section of the tutorial, you will have the option to continue on with the tutorial by pressing 1, or repeat the previous instructions by pressing 2. Again, you can skip the tutorial instructions at any time and get right to the bidding simulation by pressing *.
System Overview: <service provider>'s interactive auction system has two modes. Status mode and bidding mode.
At the beginning of every call, you will be in status mode. You will hear the auction category, current price, if you're high bidder or not, and the time left in the auction.
You will also be given a list of optional commands that can be entered in this menu to retrieve your max bid, current price, auction status, and time left in auction.
If you do not press a key, you will receive regular updates of the time left in the auction, the current item price, and your bid status.
After all the menus in the Status mode have been played one time, the system may interrupt them with real-time price and status updates from <auction provider>.
You can press * to bid at any time when in Status Mode. By pressing star, you exit the Status mode, and enter <service provider>'s Bidding Mode.
At any time, you may "exit out" of the Bidding Mode by pressing * again.
While in Bidding Mode, you may enter a max price you wish to pay for an item, followed by # to submit your selection, or you may simply press # to automatically submit a minimum bid.
After entering either a max or minimum bid, you will be prompted to confirm your selection by Pressing 1. Pressing 2 will allow you to re-enter the amount you wish to bid.
After pressing 1 to confirm your bid, <service provider> submits your bid to <auction provider>.
If your bid was successful, you will automatically return to the Status mode, where you will be updated of price changes, and the time left in the auction. Press * to bid again at any time.
If your bid was unsuccessful, or if you were immediately outbid, you will be returned to the bid menu, and have the option to immediately re-bid.
Please use this tutorial as often as you like. It's important that you feel completely comfortable when you bid on your real auctions. After only a few bid simulations, you will find that bidding on <auction provider> with <service provider> is the easiest way to win your auctions when you're away from the computer!
You will now have the opportunity to bid on a simulated Auction. You will have 3 minutes to try and win this item. This is a simulation only. This is not a real Auction.
Press 1 to continue with the tutorial. Press 2 to repeat the section of instructions you just heard.

Figure 3:
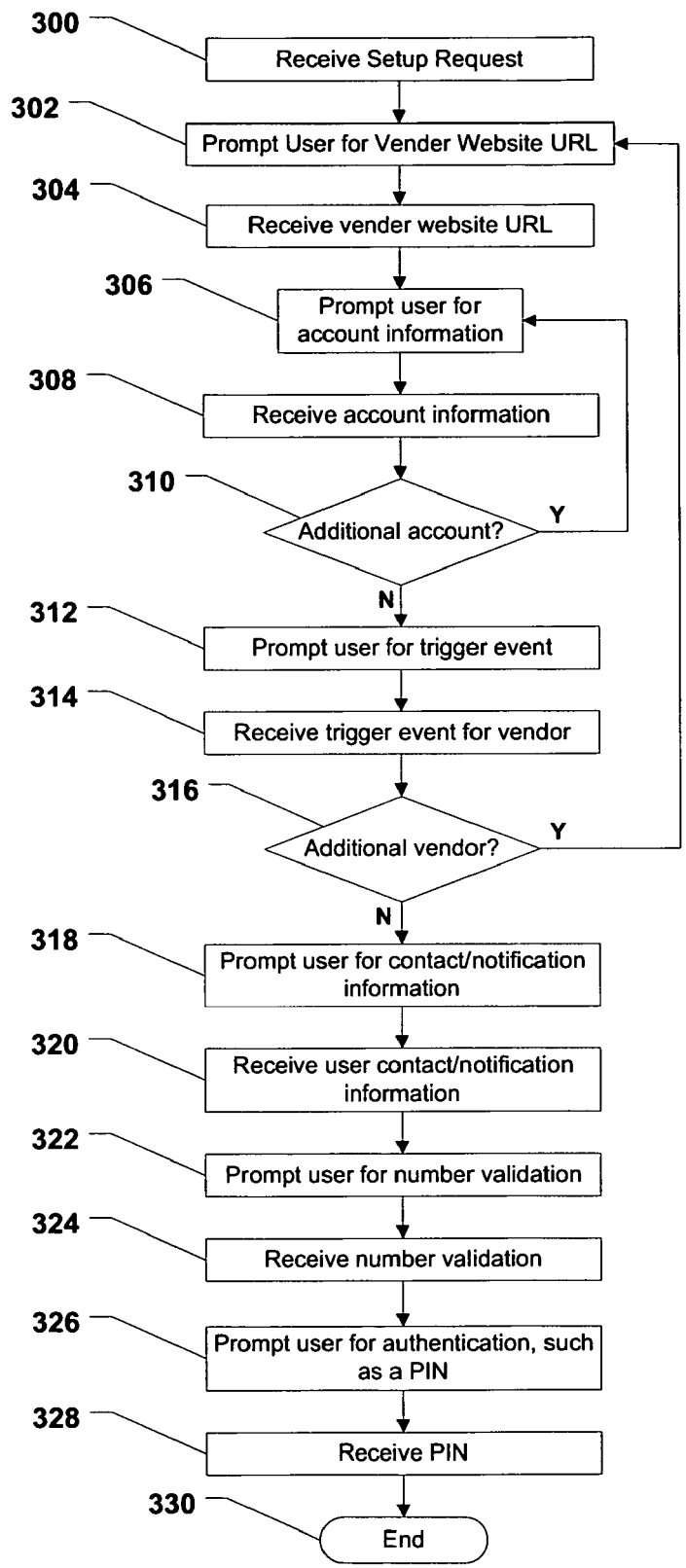
FIG. 3 is a flow chart illustrating a method of establishing a user account with a vender website monitoring system.

Referring to FIG. 3, a method of configuring a user account at the monitoring system is shown and commences at block 300. At block 300, the monitoring system receives a set up request from a user. At block 302, the user is prompted for a vendor website (URL). Moving to block 304, the monitoring system receives the vendor website URL from the user.

At block 306, the monitoring system prompts the user for account information, e.g., information concerning the user account with the vendor website. In a particular embodiment, the user account information can include a user account name, a user account number, and a user password. Moving to block 308, the system receives the user account information. Thereafter, at decision step 310, the system prompts the user to determine whether the user has an additional account with the vendor website. If so, the method returns to block 306 and continues as described.

If the user does not have an additional account with the vendor website, the method proceeds to block 312 and the user is prompted for a trigger event. In a particular embodiment, the trigger event can be a particular online auction for a particular item. Further, in a particular embodiment, the trigger event can be the release of a particular item, e.g., concert tickets, at a vendor website. Further, the trigger event can be a price decrease of a particular item, the release of a new book, the release of a new compact disk, etc. At block 314, the system receives the trigger event for the vendor.

Continuing to decision step 316, the system prompts the user to determine whether the user wishes to set up an account with another vendor. If the user indicates that the user would like to set up an account with another vendor, the method returns to block 302 and continues as described. If the user indicates that the user does not want to set up an account with another vendor, the method proceeds to block 318 and the system prompts the user for contact information or notification information. In a particular embodiment, the contact information or notification information can include a telephone number, e.g., a cellular telephone number, a mobile telephone number, or a public switched telephone network (PSTN) telephone number. At block 320, the system receives the user contact information or notification information.

Proceeding to block 322, the system prompts the user for number validation. At block 324, the system receives the number validation from the user. Next, at block 326, the system can prompt the user for an authentication, e.g., a personal identification number (PIN), that can be associated with the user account at the monitoring system. At block 328, the system receives the PIN from the user. The method then ends at state 330. Accordingly, the method described above can be used by a user to register with the monitoring system. Further, based on the information input to the monitoring system the user can be alerted when any of the trigger events input to the monitoring system occur at one or more vendor websites.

Figure 4:
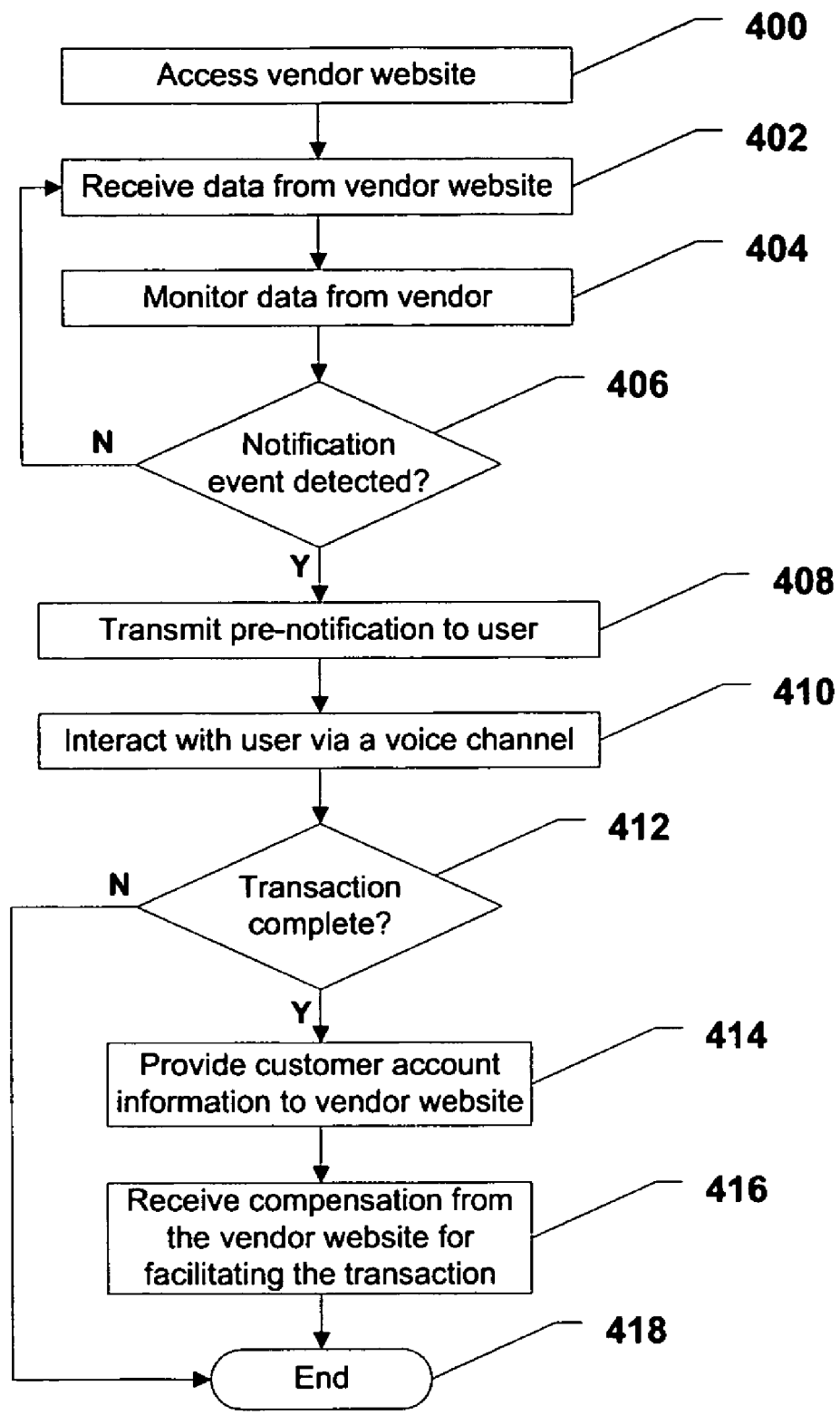
FIG. 4 is a flow chart illustrating a general method of monitoring a vender website.

Referring to FIG. 4, a method of monitoring a vendor website for a trigger event is shown. Beginning at block 400, the monitoring system accesses the vendor website, e.g., via the Internet. At block 402, the monitoring system receives data from the vendor website. Next, at block 404, the monitoring system monitors the data from the vendor website. Moving to decision step 406, the monitoring system determines whether a notification event is detected based on the data received from the vendor website. If a notification event is not detected, the method returns to block 402 and continues as described herein. In a particular embodiment, the monitoring system can detect a notification event by monitoring the data received from the vender website for one or more of the triggers input by the user, e.g., a imminent end of an auction and a price decrease of a product.

On the other hand, if a notification event is detected, the method proceeds to block 408 and the monitoring system transmits a pre-notification message to the user. Next, at block 410 the monitoring system interacts with a user via a voice channel. In a particular embodiment, the pre-notification message can be sent to the user a predetermined time before the interaction with the user, e.g., thirty minutes prior to the interaction. Additionally, the pre-notification message can be sent to the user via a short messaging system (SMS), an email system, or an alphanumeric paging system. Also, in a particular embodiment, the pre-notification message can include the exact time that the interaction with the user is scheduled, the subject of the interaction, and other relevant information, e.g., a bid status, an auction status, a time remaining for the auction, etc. Further, in an exemplary, non-limiting embodiment, the interaction with the user can be facilitated using an interactive voice response (IVR) module at the monitoring system.

Figure 5:
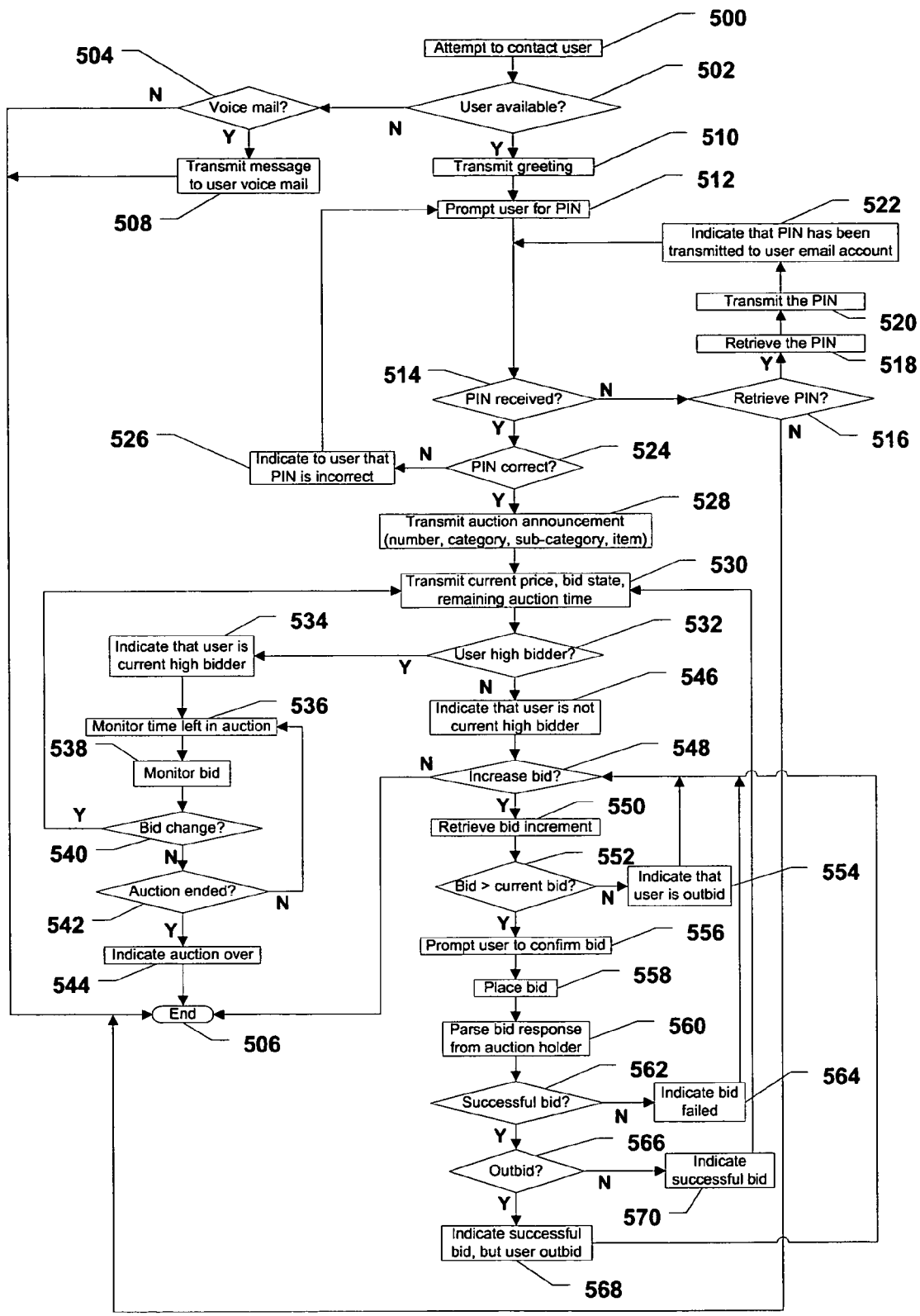
FIG. 5 is a flow chart illustrating a detailed method of contacting a registered user about an auction website.
Figure 6:
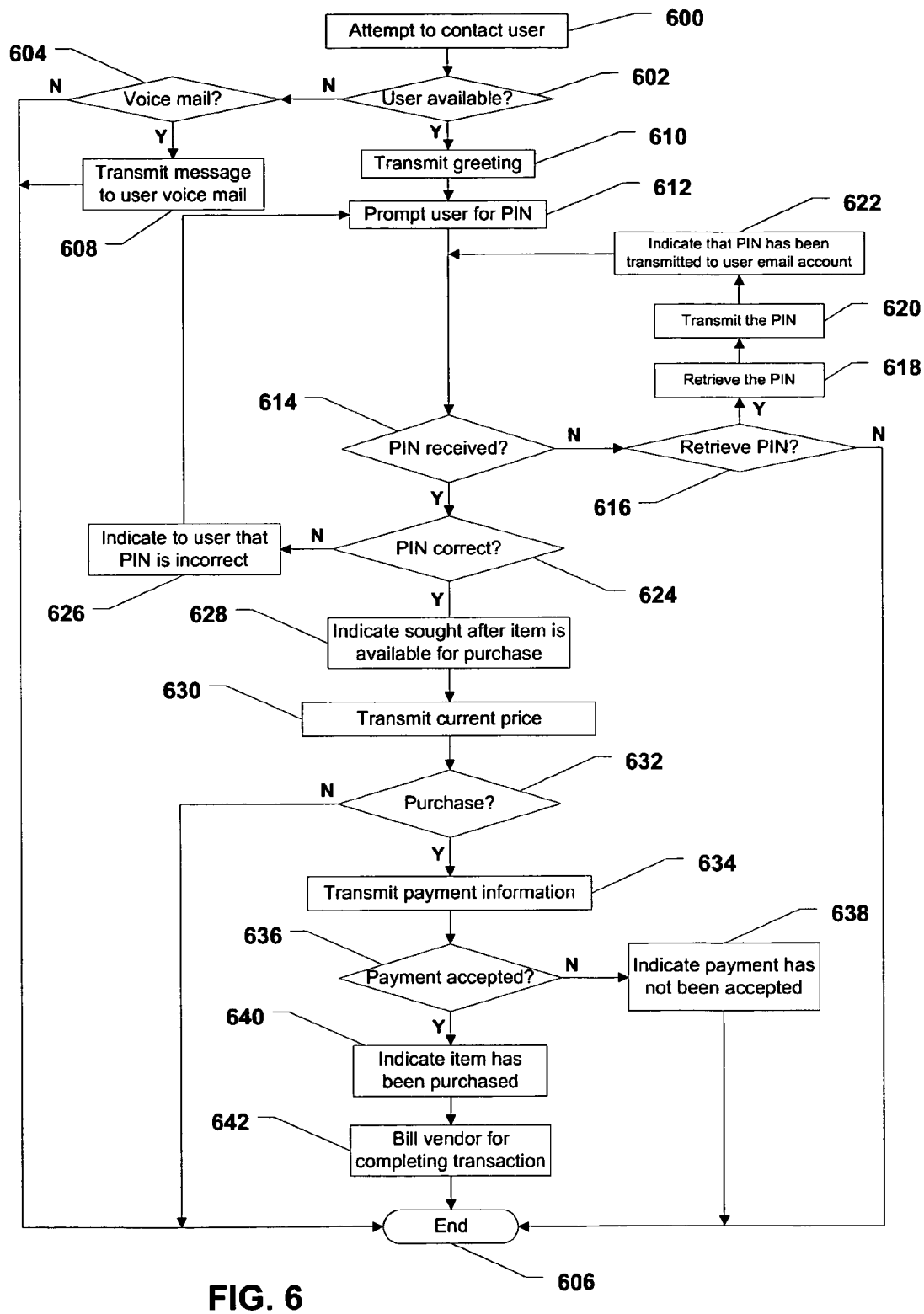
FIG. 6 is a flow chart illustrating a detailed method of contacting a registered user about an e-commerce website.

FIG. 5 depicts an exemplary method of interacting with a user that is registered with an auction website. FIG. 6 depicts an exemplary method of interacting with a user that is registered with an e-commerce website offering products for sale at set pricing.

Returning to FIG. 4, at decision step 412, the monitoring system determines whether the transaction has been completed, e.g., whether the user has purchased an item associated with the notification event or whether an auction associated with the notification event has ended. If the transaction is completed, the method proceeds to block 414 and the monitoring system provides customer account information to the vendor website. In a particular embodiment, the account information can include a login identification and a password. Further, in a particular embodiment, the account information can include an affiliate identification, which can be used to track successful bids and successful transactions. In another embodiment, the account information can include billing information, e.g., an account number, a credit card number, etc.

At block 416, the monitoring system receives compensation from the vendor website for facilitating the transaction. The method then ends at state 418. In a particular embodiment, the monitoring system can be compensated via an affiliate program associated with the vendor website. For example, an affiliate program identification can be tracked and the monitoring system can be credited for transactions. Additionally, in a particular embodiment, a transaction may include a completed purchase of an item. Alternatively, a transaction may include a successful bid for an item at an auction website. Returning to decision step 412, if the transaction is not completed, e.g., the user has decided not to purchase the item associated with the notification event, the method ends at state 418.

In a particular embodiment, the monitoring system can monitor the number of successful transactions and determine the rate at which successful transactions occur. As such, the monitoring system can further target particular users that are prone to completing transactions and purchasing goods. Further, the monitoring system can determine the percentage of total calls established that result in completed transactions that may be subject to billing to a vendor website. Alternatively, the monitoring system can determine the percentage of total calls that are compensated calls where the vendor website pays compensation either directly or through an affiliated payment plan in connection with user action made during the calls. In a particular embodiment, during operation, the percentage of total calls billed to one or more vendor websites is above a targeted percentage, e.g., ten percent, twenty percent, and fifty percent. The percentage of calls billed can be used to modify the monitoring system. For example, if the percentage of calls billed falls below the targeted percentage the monitoring system can modify the number of users that are called. Alternatively, the monitoring system can review the historical data for each user and only target those users that have a history of completing transactions via the monitoring system.

Referring to FIG. 5, a method of contacting a registered user regarding an auction website event is shown and commences at block 500. At block 500, the monitoring system attempts to contact a registered user over a voice channel, such as a cellular telephone. Next, at decision step 502, the monitoring system determines whether the user is available, i.e., has the user answered the telephone. If the user is not available, the method proceeds to decision step 504 and the monitoring system determines whether a voice mail system answers the call from the monitoring system. If not, the method ends at state 506. Otherwise, if a voice mail system answers the call from the monitoring system, the method continues to block 508 and the monitoring system transmits an audio message, e.g., an MP3 message, to the user voice mail. The method then ends at state 506.

Returning to decision step 502, when the user is available, the method proceeds to block 510 and the monitoring system transmits an audio greeting to the user 510. Thereafter, at step 512, the monitoring system prompts the user for a PIN in order to verify the user's identity. Proceeding to decision step 514, the monitoring system determines whether a PIN is received.

When a PIN is not received, the monitoring system prompts the user to determine whether the user would like the monitoring system to retrieve the PIN. If the user indicates that the user does not want the monitoring system to retrieve the PIN, the method ends at state 506. Conversely, when the user indicates to the monitoring system that the user does want the monitoring system to retrieve the PIN, the method proceeds to block 518 and the monitoring system retrieves the user PIN. Next, at block 520, the monitoring system transmits the user PIN to the user email account. At block 522, the monitoring system indicates that the PIN has been transmitted to the user email account.

Returning to decision step 514, when a PIN is received from the user, the method proceeds to decision step 524 and the monitoring system determines whether the PIN is correct. If the PIN is incorrect, the method moves to block 526 and the monitoring system indicates to the user that the PIN is incorrect. The method then returns to block 512 and continues as described herein.

When a correct PIN is received at decision step 524, the method continues to block 528 and the monitoring system transmits an auction announcement to the user, e.g., by transmitting an audio message to the user. In a particular embodiment, the auction announcement can include the number of the auction, the category of the auction, the sub-category of the auction, and the name of the item. Thereafter, at block 530, the monitoring system transmits the current price of the item, the current bid state, and the remaining auction time to the user. In a particular embodiment, the monitoring system can contact the user when the remaining auction time is less than ten minutes, e.g., six minutes, three minutes, etc. Further, in an alternative embodiment, a time remaining for the auction can be transmitted to the user in response to the user inputting a request for the time remaining, e.g., using a keypad at a telephone. In another alternative embodiment, the time remaining can be dynamically injected into a phone session in order to give real-time updates concerning the time remaining for the auction or a quantity remaining for a particular item.

Moving to decision step 532, the monitoring website determines whether the user is the high bidder. If the user is the high bidder, the method continues to block 534 and the monitoring system indicates to the user that the user is the high bidder. At block 536, the monitoring system monitors the time remaining in the auction. Next, at block 538, the monitoring system monitors the bid. Proceeding to decision step 540, the monitoring system determines whether the bid has changed. If the bid changes, the method returns to block 530 and continues as described.

On the other hand, if the bid has not changed, the method moves to decision step 542 and the monitoring system determines whether the auction has ended. If the auction has not ended, the method returns to block 536 and continues as described herein. When the auction ends, the method moves to block 544 and the monitoring system indicates that the auction has ended. The method then ends at state 506.

Returning to decision step 532, if the user is not the high bidder, the method proceeds to block 546 and the monitoring system indicates that the user is not the high bidder. Next, at decision step 548, the monitoring system prompts the user to determine whether the user would like to increase his or her bid. If the user does not want to increase the bid, the method ends at state 506. When the user wants to increase the bid, the method moves to block 550 and the monitoring system retrieves the bid increment from the auction website. In a particular embodiment, the monitoring system can increase the user's bid to the user's maximum bid.

In a particular embodiment, the monitoring system determines real-time state information, such as high-bid status, through interaction with the auction website. For example, the time remaining for an auction can be managed at the auction website and the monitoring system can periodically poll the auction website in order to determine the time remaining.

Proceeding to decision step 552, the monitoring system determines whether the user's bid is greater than the current bid. If the user's bid is not greater than the current bid, the method proceeds to block 554 and the monitoring system indicates that the user is still outbid. The method returns to decision step 548 and continues as described. At decision step 552, when the user's bid is greater than the current bid, the method moves to block 556 and the monitoring system prompts the user to confirm the bid. Next, at block 558, the monitoring system places the bid for the user.

Continuing to block 560, the monitoring system parses a bid response received from the auction website. At decision step 562, the monitoring system determines whether the user's bid is successful. If the user's bid is not successful, the method proceeds to block 564 and the monitoring system indicates that the user's bid has failed. The method then returns to decision step 548 and continues as described herein.

At decision step 562, if the user's bid is successful, the method proceeds to decision step 566 and the monitoring system determines whether the user has been outbid. If the user is outbid, the method proceeds to block 568 and the monitoring system indicates to the user that the bid is successful, but the user has been outbid. The method then returns to decision step 548 and continues as described. Conversely, if the user is not outbid, the method proceeds to block 570 and the monitoring system indicates to the user that the user's bid was successful. Then, the method returns to block 530 and continues as described.

Referring to FIG. 6, a method of contacting a registered user about an e-commerce website is shown and commences at block 600. At block 600, the monitoring system attempts to contact a registered user via a telephone, e.g., a cellular telephone or a landline telephone. Next, at decision step 602, the monitoring system determines whether the user is available, i.e., has the user answered the call. If the user is not available, the method proceeds to decision step 604 and the monitoring system determines whether a voice mail system answers the call from the monitoring system. If not, the method ends at state 606. Otherwise, if a voice mail system answers the call from the monitoring system, the method continues to block 608 and the monitoring system transmits an audio message, e.g., an MP3 message, to the user voice mail. The method then ends at state 606.

Returning to decision step 602, when the user is available, the method proceeds to block 610 and the monitoring system transmits an audio greeting to the user 610. Thereafter, at step 612, the monitoring system prompts the user for a PIN in order to verify the user's identity. Proceeding to decision step 614, the monitoring system determines whether a PIN is received.

When a PIN is not received, the monitoring system prompts the user to determine whether the user would like the monitoring system to retrieve the PIN. If the user indicates that the user does not want the monitoring system to retrieve the PIN, the method ends at state 606. Conversely, when the user indicates to the monitoring system that the user does want the monitoring system to retrieve the PIN, the method proceeds to block 618 and the monitoring system retrieves the user PIN. Next, at block 620, the monitoring system transmits the user PIN to the user email account. At block 622, the monitoring system indicates that the PIN has been transmitted to the user email account.

Returning to decision step 614, when a PIN is received from the user, the method proceeds to decision step 624 and the monitoring system determines whether the PIN is correct. If the PIN is incorrect, the method moves to block 626 and the monitoring system indicates to the user that the PIN is incorrect. The method then returns to block 612 and continues as described.

When a correct PIN is received at decision step 624, the method continues to block 628 and the monitoring system indicates that a sought after item, e.g., an item on a watch list or wish list established by the user with the monitoring system or the vendor website, is available for purchase or is at a target price desired by the user. Next, at block 630, the monitoring system transmits a current price to the user. In a particular embodiment, the monitoring system communicates with the user by transmitting audio messages to the user. Moving to decision step 632, the monitoring system prompts the user in order to determine whether the user wants to purchase the sought after item. If the user does not want to purchase the sought after item, the method ends at state 606.

On the other hand, if the user indicates that the user wants to purchase the sought after item, the method proceeds to block 634 and the monitoring system transmits the user payment information, previously supplied to the monitoring system, to the vender website. Thereafter, at block 636, the monitoring system determines whether payment has been accepted by the vendor website. If payment is not accepted, the method proceeds to block 638 and the monitoring system indicates to the user that payment has not been accepted by the vendor website. The method then ends at state 606. In a particular embodiment, payment can be facilitated using previously stored payment data, e.g., using a "one click" shopping mechanism at the vendor website.

When payment is accepted, the method proceeds to block 640 and the monitoring system indicates to the user that the sought after item has been purchased. Proceeding to block 642, the monitoring system bills the vendor website for completing the transaction. The method then ends at state 606.

In one or more of the methods disclosed, a user is authenticated by inputting a PIN. However, the user can input one or more alternative authentication inputs. For example, the authentication input can be a biometric input, such as a voice input, a fingerprint scan, a palm scan, an iris scan, a retinal scan, facial mapping, infrared pattern matching, etc. Alternatively, the authentication can be performed using a physical token device, e.g., a passkey or a universal serial bus (USB) dongle.

Figure 7:
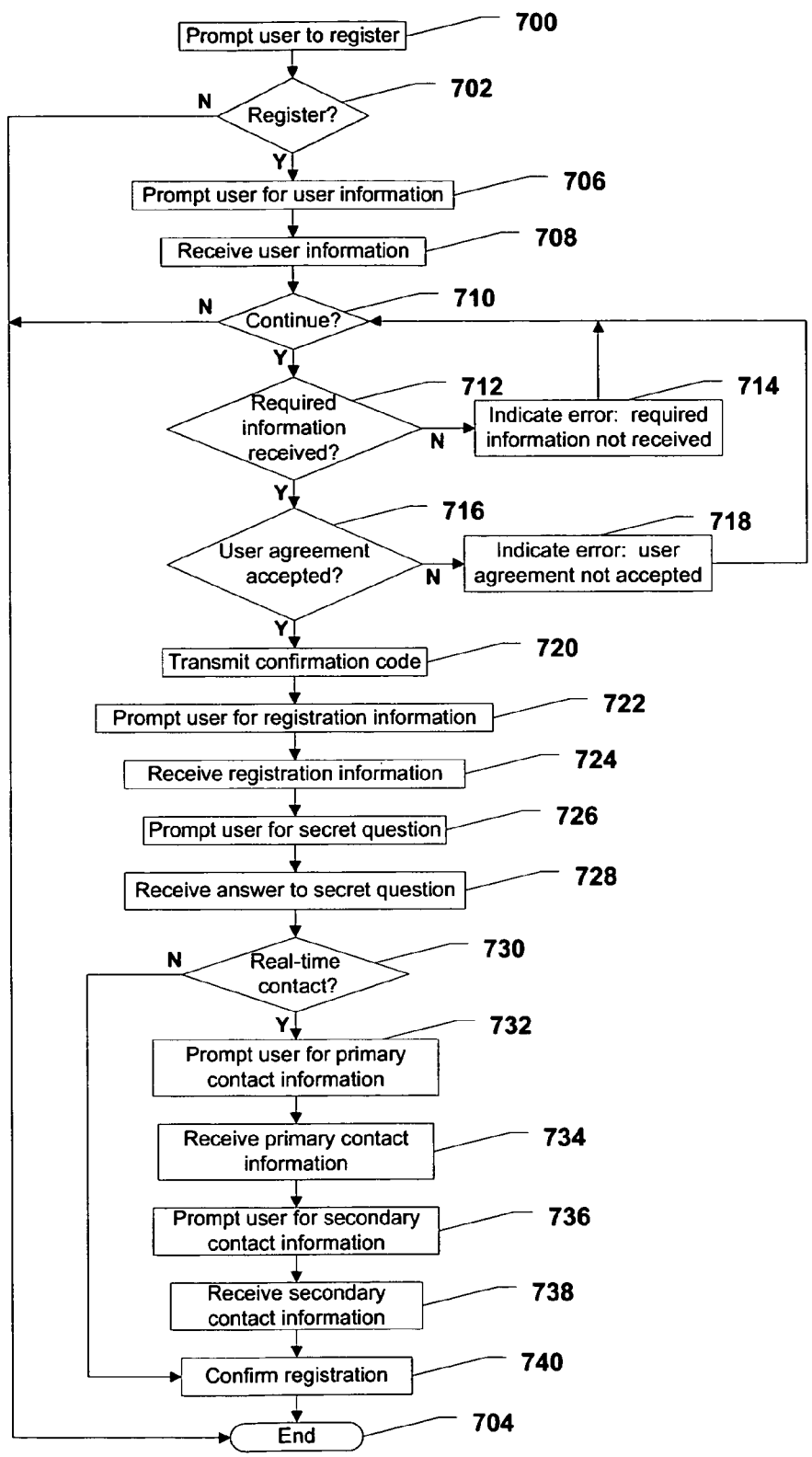
FIG. 7 is a flow chart illustrating a method of establishing a user account with a vender system.

Referring to FIG. 7, a method of establishing a user account with a vender system is shown and commences at block 700. At block 700, the vendor website prompts the user to register with the vendor website. Next, at block 702, the vendor website determines whether an indication to register with the vendor website is received. When an indication to not register is received, the method ends at state 704. On the other hand, when an indication to register with the vendor website is received, the method moves to block 706 and the vendor website is prompted for user information. At block 708, the vendor website receives the user information. In a particular embodiment, the user information includes a first name, a last name, an address, a city, a state, a zip code, a country, a primary telephone number, a secondary telephone number, a date of birth, and an email address.

Proceeding to decision step 710, the vendor website determines whether a continue button is selected before a timeout period ends. If the continue button is not selected, the method ends at state 704. When the continue button is selected, the method moves to decision step 712 and the vendor website determines whether the required information is received from the user. If the required information is not received from the user, the method moves to block 714 and the vender website indicates an error to the user that all or some of the required information was not received from the user. The method then returns to decision step 710 and continues as described.

Returning to decision step 712, when the required information is received, the method continues to decision step 716 and the vendor website determines whether a user agreement is accepted by the user, e.g., by selecting a box next to a statement that affirms that the user has accepted the user agreement. If the user agreement is not accepted, the method proceeds to block 718 and the vendor website indicates an error to the user that the user agreement has not been accepted. The method then returns to decision step 710 and continues as described. At decision step 716, when the user agreement is accepted, the method continues to block 720 and the vendor website transmits a confirmation code.

Moving to block 722, the vendor website prompts the user for registration information. At block 724, the vendor website receives the user registration information. In a particular embodiment, the user registration information includes an identification, a password, an email address, and the confirmation code transmitted to the user. Further, the identification and the password can be selected by the user and approved by the vendor website.

At block 726, the vendor website prompts the user for a secret question. At block 728, the vendor website prompts the user for the answer to the secret question. In a particular embodiment, the secret question and answer can be used as a second level of security in order to verify the user's identity with the vendor website, e.g., when the user contacts the vendor website to modify one or more account settings.

Continuing to decision step 730, the vendor website prompts the user to determine whether the user would like to receive real-time product status updates, e.g., auction updates, via a voice channel provided by a wireless telephone or a land-line telephone. If the user wants to receive real-time product status updates, the method continues to block 732 and the vendor website prompts the user for primary contact information, e.g., a wireless telephone number. At block 734, the vendor website receives the primary contact information. Further, at block 736, the vendor website prompts the user for secondary contact information. At block 738, the vendor website receives the secondary contact information. Then, the vendor website confirms the registration at block 740 and the method ends at state 704.

Returning to decision step 730, when the user chooses not to receive real-time product updates, the method proceeds to block 740 and the vendor website confirms the user registration. The method then ends at 704. In a particular embodiment, the primary contact information can be the primary telephone number received above. Further, the secondary contact information can be the secondary telephone number received above. Alternatively, the user may want to contact via other telephone numbers not input with the user information.

Figure 8:
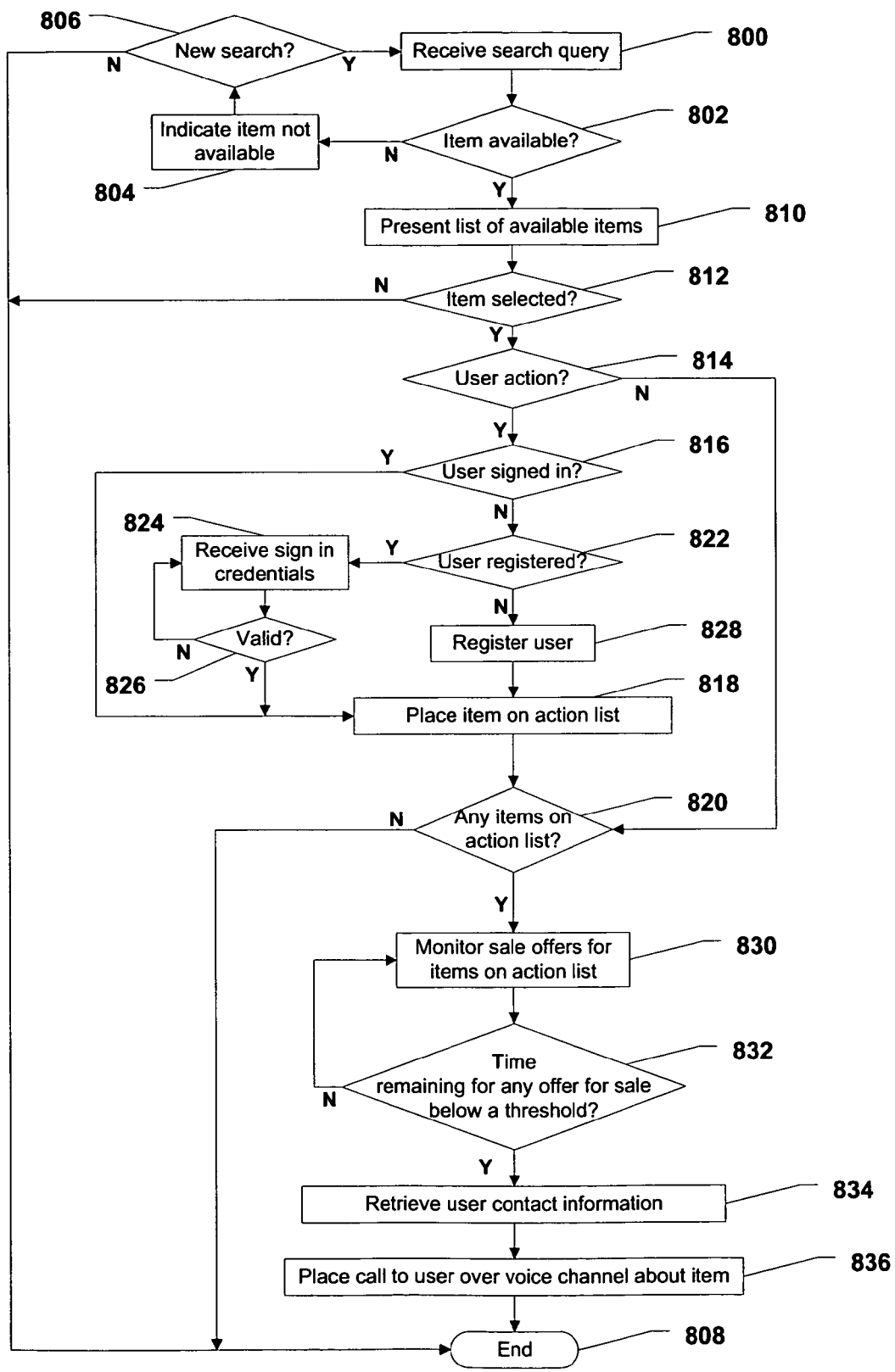
FIG. 8 is a flow chart illustrating a detailed method of contacting a registered user about a product available at a vender website.

FIG. 8 illustrates a method of contacting a registered user about a product available at a vender website. Beginning at block 800, a vendor website receives a search query. At decision step 802, the vendor website determines whether an item is available based on the search query. If no item is available, the method moves to block 804 and the vendor website indicates that the item is not available. Moving to decision step 806, the vendor website determines whether a new search is received. If a new search is received, the method returns to block 800 and continues as shown. Otherwise, if a new search is not received, the method ends at state 808.

Returning to decision step 802, if one or more items that satisfy the search query are available, the method continues to block 810 and the vendor website presents a list of the items that satisfy the search query. At decision step 812, the vendor website determines if any items on the list are selected. If not, the method ends at state 808. On the other hand, if any items are selected, the method proceeds to decision step 814 and the vendor website determines whether any user action has been taken with respect to the selected items. In a particular embodiment, the user action can be a bid, a request to watch the item, or a best offer for the item.

When user action is taken with respect to a selected item, the method proceeds to decision step 816 and the vendor website determines whether the user is signed in. If the user is signed in, the method proceeds to block 818 and the selected item is placed on an action list. The method then moves to decision step 820.

Returning to decision step 816, when the user is not signed in, the method proceeds to decision step 822 and the vendor website determines whether the user is registered with the vendor website. If the user is registered, the method proceeds to block 824 and the vendor website receives the user registration credentials. At decision step 826, the vendor website determines whether the registration credentials are valid. If so, the method proceeds to block 818 and the selected item is placed on the action list. The method then moves to decision step 820. At decision step 826, if the registration credentials are invalid, the method returns to block 824 and continues as described herein. At decision step 822, if the user is not registered, the method proceeds to block 828 and the vendor website registers the user. The method then moves to decision step 820.

Returning to decision step 814, if no user action is taken with respect to a selected item, the method moves directly to decision step 820 and the vendor website determines whether there are any items on the user's action list, e.g., previously selected items and currently selected items. If there are not any items on the user's action list, the method ends at state 808. Conversely, if there are items on the user's action list, the method proceeds to block 830 and the vendor website monitors sale offers for the items on the action list.

Proceeding to decision step 832, the vendor website determines whether a time remaining for any offer of sale is below a predetermined threshold. If the time remaining for any offer of sale is not below the predetermined threshold, the method returns to block 830 and continues as illustrated in FIG. 8. On the other hand, if the time remaining for any offer of sale is below the predetermined threshold, the method continues to block 834 and the vendor website retrieves the user contact information. Thereafter, at block 836, the vendor website places a call regarding the item to the user over a voice channel. The method then ends at state 808. In a particular embodiment, the vendor website can contact the user using the method depicted in FIG. 5. In an alternative embodiment, the vendor website can contact the user using the method depicted in FIG. 6. Additionally, the vendor website can attempt to contact the user using the primary contact information first. If the user is unavailable via the primary contact information, the method attempts to contact the user using the secondary primary contact information.

Figure 9:
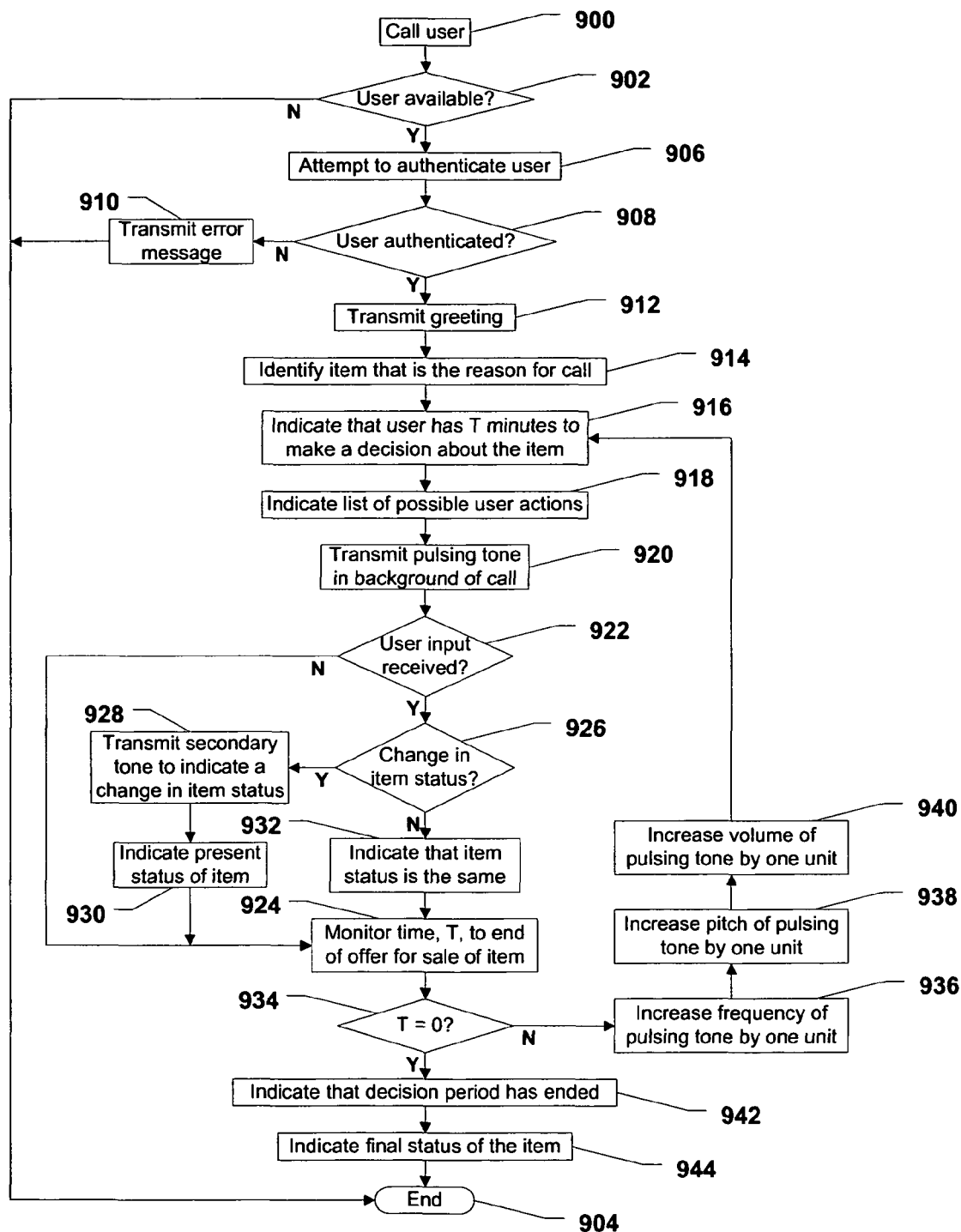
FIG. 9 is a flow chart illustrating an alternative detailed method of contacting a registered user about a product available at a vender website.

Referring to FIG. 9, an alternative method of contacting a registered user about a product available at a vender website is illustrated and commences at block 900. At block 900, a vendor website initiates a telephone call to a user, e.g., to a primary contact telephone number or a secondary contact telephone number. At decision step 902, the vendor website determines whether the user is available, i.e., has the answered the telephone call. If the user is not available, the method ends at state 904.

On the other hand, when the user is available, the method proceeds to block 906 and the vendor website attempts to authenticate the user. For example, in a particular embodiment, the vendor website can prompt the user for an identification and a PIN. At decision step 908, the vendor website determines whether the user is authenticated. If the user is not authenticated, the method moves to block 910 and the vendor website transmits an error message to the user. The method then ends at state 904.

Returning to decision step 908, when the user is authenticated, the method proceeds to block 912 and the vendor website transmits a greeting to the user. At block 914, the vendor website identifies the item that is the reason for the call. Thereafter, at block 916, the vendor website indicates that user has T minutes to make a decision about the item. In a particular embodiment, T is a time remaining of an offer for sale for the item or an auction for the item. At block 918, the vendor website indicates a list of possible actions that the user can take with respect to the item, e.g., bid for the item, purchase the item, cancel the item watch, etc.

Proceeding to block 920, the vendor website transmits a pulsing tone in the background of the call. At decision step 922, the vendor website determines whether any user input has been received, e.g., a tone due to a keypress that corresponds to a user action or a voice command that corresponds to a user action. If user input is not received, the method continues to block 924 and the vendor website monitors the time, T, until the end of the offer for sale of the item. On the other hand, if user input is received, the method moves to decision step 926 and the vendor website determines whether the status of the item has changed in response to the user input. If the status of the item changes in response to the user input, the method proceeds to block 928 and the vendor website transmits a secondary tone to indicate a change the status of the item. Next, at block 930, the vendor website indicates the present status of the item to the user. Thereafter, the method moves to block 924.

Returning to decision step 926, if the status does not change in response to the user input, the method continues to block 932 and the vendor website indicates to the user that the status of the item is the same. The method then moves to block 924 and the vendor website monitors the time, T, until the end of the offer for sale of the item.

Continuing to decision step 934, the vendor website determines whether T is zero and the offer for sale of the item has ended. If the T is not zero, the method proceeds to block 936 and the vendor website increases the frequency of the pulsing tone by one unit. At block 938, the vendor website increases the pitch of the pulsing tone by one unit. Further, at block 940, the vendor website increases the volume of the pulsing tone by one unit.

Returning to decision step 934, when T is zero, method proceeds to block 942 and the vendor website indicates that decision period has ended. At block 944, the vendor website indicates the final status of the item. The method then ends at state 904.

Figure 10:
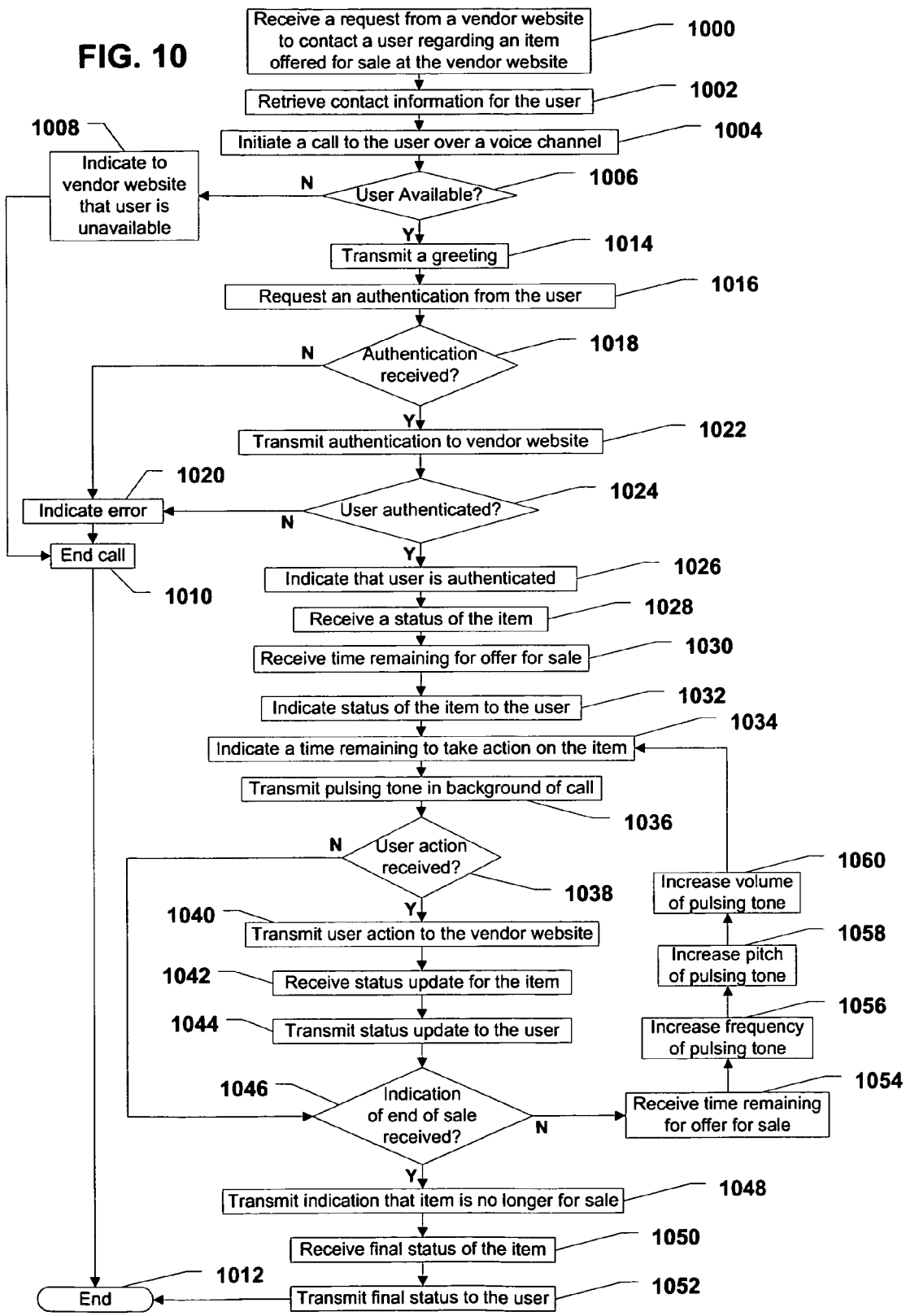
FIG. 10 is a flow chart illustrating another alternative detailed method of contacting a registered user about a product available at a vender website.

FIG. 10 illustrates another alternative method of contacting a registered user about a product available at a vender website. Beginning at block 1000, a third party system receives a request from a vendor website to contact a user regarding an item that is offered for sale at the vendor website. At block 1002, the third party system retrieves contact information for the user. In a particular embodiment, the contact information can include primary contact information and secondary contact information. Further, the third party system can retrieve the contact information from the vendor website or from a database coupled to the thirty party system.

Moving to block 1004, the third party system initiates a call to the user over a voice channel using the user contact information. At decision step 1006, the third party system determines whether the user is available, i.e., has the user answered the telephone call. If the user is not available, the method moves to block 1008 and the third party system indicates to the vender website that the user is not available. At block 1010, the third party system ends the call and the method ends at state 1012.

Returning to decision step 1006, when the user is available, the method proceeds to block 1014 and the third party system transmits a greeting to the user. At block 1016, the third party system requests an authentication from the user. Moving to decision step 1018, the third party system determines whether an authentication is received from the user. If not, the method proceeds to block 1020 and the third party system indicates an error to the user, e.g., that an authentication has not been received from the user. Thereafter, at block 1010, the third party system ends the call and the method ends at state 1012.

At decision step 1018, when an authentication is received from the user, the method continues to block 1022 and the third party system transmits the authentication to the vendor website. Moving to decision step 1024, the third party system determines whether the user is authenticated based on a response from the vendor website. If the user is not authenticated, the method proceeds to block 1020 and the third party system indicates an error to the user, e.g., that the user has not been authenticated. The third party system ends the call at block 1010 and the method ends at state 1012.

Conversely, when the user is authenticated at decision step 1024, the method proceeds to block 1026 and the third party system indicates to the user that user is authenticated. At block 1028, the third party system receives a status of an item that the user has previously indicated that he or she would like the vendor website to watch and sends real time updates associated with the item. Moving to block 1030, the third party system receives a time remaining for the offer for sale for the item from the vendor website. At block 1032, the third party system indicates the status of the item to the user and the third party system indicates a time remaining to take action on the item at block 1034.

Proceeding to block 1036, the third party system transmits a pulsing tone in the background of the call. At decision step 1038, the third party system determines whether a user action concerning the item has been received from the user. If a user action is received, the method moves to block 1040 and the third party system transmits the user action to the vendor website. Then, at block 1042, the third party system receives a status update for the item from the vendor website. Further, at block 1044, the third party system transmits the status update to the user. The method then moves to decision step 1046.

Returning to decision step 1038, if no user action is received, the method also proceeds to decision step 1046. At decision step 1046, the third party system determines whether an indication of an end of the offer for sale of the item is received from the vendor server. If so, the method continues to block 1048 and the third party system transmits an indication to the user that item is no longer for sale. At block 1050, the third party system receives a final status of the item. Additionally, the third party system transmits the final status to the user at block 1052. The method then ends at state 1012.

Returning to decision step 1046, when an indication of an end of the offer for sale of the item is received, the method moves to block 1054 and the third party system receives a time remaining for offer for sale from the vendor website. At block 1056, the third party system increases a frequency of the pulsing tone. At block 1058, the third party system increases a pitch of the pulsing tone. Moreover, at block 1060, the third party system increases a volume of the pulsing tone. The method then returns to block 1034 and continues as illustrated in FIG. 10.

With the configuration of structure described above, the system and method of event triggered voice call origination provides a way to monitor auction websites and e-commerce websites and facilitate transactions with those websites. For example, the system can contact a user concerning an item that the user has submitted a bid to purchase at an auction website. In particular, the system can contact the user as the auction for the item is nearing its scheduled end. The system can communicate voice messages to the user concerning the item, e.g., price, current bid status, item category, item subcategory, time remaining, etc. Also, the system can communicate non-voice messages to the user to indicate time remaining or a change in bid status. For example, the non-voice message can include a pulsing tone that speeds up as the end of the auction nears. Moreover, the non-voice message can include a secondary tone that indicates whether the user has become the high bidder or whether the user has been outbid. The user can interact with the system using a keypad at a communication device and can submit additional bids via the communication device. Alternatively, the user can interact with the system using voice commands.

In another embodiment, the system, method and user interface provides a notification device that includes a voice message generation module that can be used to generate a voice message and a non-voice message generation module that can be used to generate a non-voice message. Also, the notification device includes a communication interface that can be used to communicate the voice message and the non-voice message over a voice channel. The notification device can include primary contact information associated with a user and the communication interface can communicate with the user using the primary contact information.

Additionally, the notification device can include secondary contact information associated with the user and the communication interface can communicate with the user using the secondary contact information when the communication interface is unable to contact the user using the primary contact information. Moreover, the communication interface can communicate with a user voice mail when the user is unavailable.

In a particular embodiment, the voice message provided by the notification device includes at least one of the following: a greeting, an authentication request, an auction number, a category, a sub-category, an item name, a current price, a current bid, and a bid increment. Also, the voice message can include an indication of whether or not the user is a high bidder.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of informing a user from a monitoring system about an item that is available via an e-commerce website, the method comprising:
    authenticating the user at the monitoring system;
    transmitting at least one voice message to the user from the monitoring system; and
    transmitting to the user from the monitoring system at least one audible non-voice signal that changes in response to a change in a status of the item, the at least one audible non-voice signal audibly indicating to the user a time period in which user input can be received, the at least one audible non-voice signal transmitted concurrently with the at least one voice message and transmitted in a background of the at least one voice message, wherein the user input is related to the item that is available via the e-commerce website.

2. The method of claim 1, further comprising:
    receiving the user input at the monitoring system; and
    determining at the monitoring system whether the status of the item has changed in response to the user input.

3. The method of claim 2, wherein receiving the user input comprises receiving one of a bid, a bid increase, and a request to purchase the item.

4. The method of claim 1, wherein the at least one audible non-voice signal is a pulsing tone.

5. The method of claim 1, further comprising:
    indicating to the user from the monitoring system that the time period in which user input can be received has ended; and
    indicating to the user from the monitoring system a final status of the item.

6. The method of claim 1, further comprising placing a call to the user from the monitoring system over a voice channel, wherein the at least one voice message is transmitted via the call.

7. The method of claim 6, wherein transmitting the at least one voice message comprises transmitting one or more of a greeting, a reason for the call, and a prompt for a personal identification number, wherein the reason for the call relates to an event associated with the e-commerce website.

8. The method of claim 1, further comprising, before transmitting the at least one voice message:
    receiving a request at the monitoring system to contact the user when an unavailable item becomes available via the e-commerce website;
    retrieving contact information for the user; and
    initiating, from the monitoring system, a call to the user over a voice channel using an automated notification device in response to the unavailable item becoming available via the e-commerce website.

9. The method of claim 1, wherein authenticating the user comprises:
    receiving an authentication credential from the user at the monitoring system; and
    sending the authentication credential from the monitoring system to a server associated with the e-commerce website to be authenticated.

10. The method of claim 1, wherein the at least one audible non-voice signal further comprises an indicator of a timer countdown.

11. The method of claim 4, further comprising increasing a frequency of the pulsing tone as the time period winds down.

12. The method of claim 4, further comprising decreasing a volume of the pulsing tone as the time period winds down.

13. The method of claim 4, further comprising increasing a pitch of the pulsing tone as the time period winds down.

14. The method of claim 1, further comprising receiving the status of the item at the monitoring system from the e-commerce website, wherein the at least one voice message includes an indication of the status of the item.

15. The method of claim 14, further comprising:
    receiving input at the monitoring system indicating a user action;
    transmitting data indicating the user action from the monitoring system to a server associated with the e-commerce website; and
    receiving at the monitoring system an updated status of the item in response to the user action.

16. The method of claim 15, wherein the at least one voice message comprises an indication of the updated status.

17. The method of claim 15, further comprising receiving the input indicating the user action via a selection of a key at a keypad.

18. The method of claim 15, further comprising receiving the input indicating the user action via a voice command.

19. The method of claim 1, further comprising receiving an end of sale indication at the monitoring system from a server associated with the e-commerce website, wherein the end of sale indication indicates that the item is no longer available via the e-commerce website.

20. The method of claim 19, further comprising indicating that the item is no longer available via the e-commerce website via the at least one voice message.

21. A monitoring system to contact a user about an item that is available via an e-commerce website, the system comprising:
    a processor; and
    a memory accessible to the processor, the memory including instructions executable by the processor to:
        authenticate a user;
        transmit at least one voice message to the user; and
        transmit at least one audible non-voice signal to the user that changes in response to a change in status of the item, the at least one audible non-voice signal audibly indicating to the user a time period in which user input can be received, the at least one audible non-voice signal transmitted concurrently with the at least one voice message and transmitted in a background of the at least one voice message, wherein the user input is related to the item that is available via the e-commerce website.

22. The system of claim 21, further comprising a voice generation module, wherein the voice generation module includes data to generate the at least one voice message.

23. The system of claim 22, wherein the voice generation module is operable to generate a first voice message comprising one or more of a greeting, a reason for the call, and a prompt for a personal identification number (PIN), wherein the reason for the call relates to an event associated with the e-commerce website.

24. The system of claim 23, wherein the voice generation module is operable to generate a second voice message comprising at least one of: an indication that the PIN is incorrect, a prompt to the user to try inputting the PIN again, and a prompt to press a selected button to receive the PIN via an email address.

25. The system of claim 24, wherein the voice generation module is operable to generate a third voice message comprising at least one of: an indication that the user can bid on an auction for the item, an auction number associated with the item, a category associated with the item, and a sub-category associated with the item.

26. The system of claim 25, wherein the voice generation module is operable to generate a fourth voice message comprising at least one of: a current high bid for the item, an indication that the user is currently a high bidder, and an indication that the user is currently not a high bidder.

27. The system of claim 26, wherein the voice generation module is operable to generate one or more of:
 a fifth voice message, wherein the fifth voice message includes a prompt to press start to place a bid;
 a sixth voice message, wherein the sixth voice message includes an indication of a time remaining for the auction for the item;
 a seventh voice message, wherein the seventh voice message includes at least one of: a prompt to press pound to enter a minimum bid and a prompt to enter the bid in dollars and cents and to press pound to enter a maximum bid;
 an eighth voice message, wherein the eighth voice message includes an indication that the bid is less than a current minimum bid;
 a ninth voice message, wherein the ninth voice message includes at least one of: an indication of the bid entered by the user, a prompt to press one to confirm the bid entered by the user, a prompt to press two to enter a different bid amount, and a prompt to press star to cancel the bid;
 a tenth voice message, wherein the tenth voice message includes an indication that the bid is a successful bid;
 an eleventh voice message, wherein the eleventh voice message includes an indication that the current high bid has changed;
 a twelfth voice message, wherein the twelfth voice message includes an indication that the bid is a successful bid, but the another user has outbid the user;
 a thirteenth voice message, wherein the thirteenth voice message includes at least one of: a prompt to hear the user's current maximum bid, a prompt to get the current high bid for the item, a prompt to get the time remaining for the auction, a prompt to get the category associated with the item, and a prompt to hear one or more options again;
 a fourteenth voice message, wherein the fourteenth voice message includes an indication that an invalid key has been pressed;
 a fifteenth voice message, wherein the fifteenth voice message includes an indication that the auction has ended early;
 a sixteenth voice message, wherein the sixteenth voice message includes an indication that the user has cancelled the bid;
 a seventeenth voice message, wherein the seventeenth voice message includes an indication that the system is unable to communicate with a server associated with the e-commerce website;
 an eighteenth voice message, wherein the eighteenth voice message includes an indication that the PIN is correct, but a username and password associated with the e-commerce website must be updated;
 a nineteenth voice message, wherein the nineteenth voice message includes an indication that the auction ended before the bid was submitted;
 a twentieth voice message, wherein the twentieth voice message includes an indication that the bid is being submitted to the server associated with the e-commerce website;
 a twenty-first voice message, wherein the twenty-first voice message includes an indication that the auction has ended;
 a twenty-second voice message, wherein the twenty-second voice message includes at least one of an indication that the user has won the auction and an instruction to check an email address for information to complete a transaction associated with the auction for the item;
 a twenty-third voice message, wherein the twenty-third voice message includes an indication that the user has not won the auction;
 a twenty-fourth voice message, wherein the twenty-fourth voice message includes an indication that that the user can skip ahead at any time; and
 a twenty-fifth voice message, wherein the twenty-fifth voice message includes at least one of an indication that an auction status is being updated and an indication that a close of the auction is being verified with the server associated with the e-commerce website.

28. A computer-readable storage medium, comprising:
 instructions, that when executed by a processor, cause the processor to authenticate a user;
 instructions, that when executed by the processor, cause the processor to transmit at least one voice message to the user, the at least one voice message related to an item that is available via an e-commerce website; and
 instructions, that when executed by the processor, cause the processor to transmit at least one audible non-voice signal to the user that changes in response to a change in status of the item, the at least one audible non-voice signal audibly indicating to the user a time period in which user input can be received, the at least one audible non-voice signal transmitted concurrently with the at least one voice message and transmitted in a background of the at least one voice message, wherein the user input is related to the item that is available via the e-commerce website.

* * * * *